Oct. 23, 1934.　　　F. G. WALKER　　　1,977,977
DISHWASHING MACHINE
Filed July 26, 1930　　　3 Sheets-Sheet 1
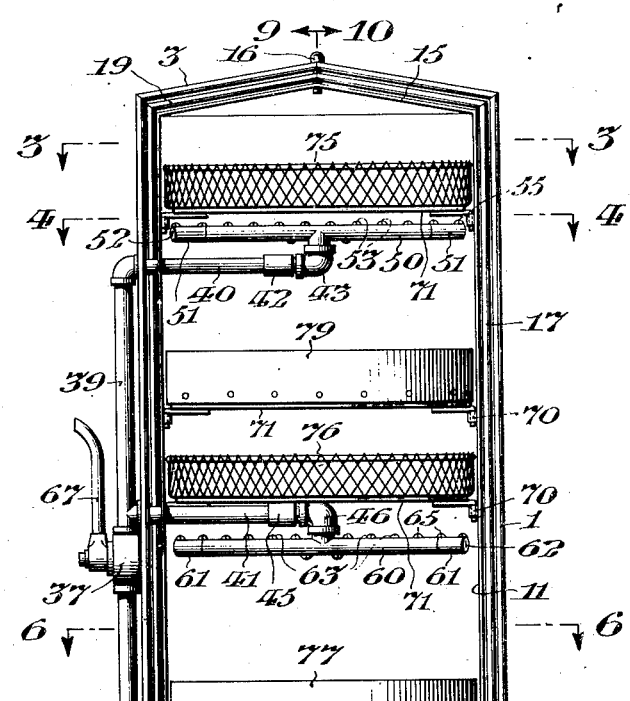
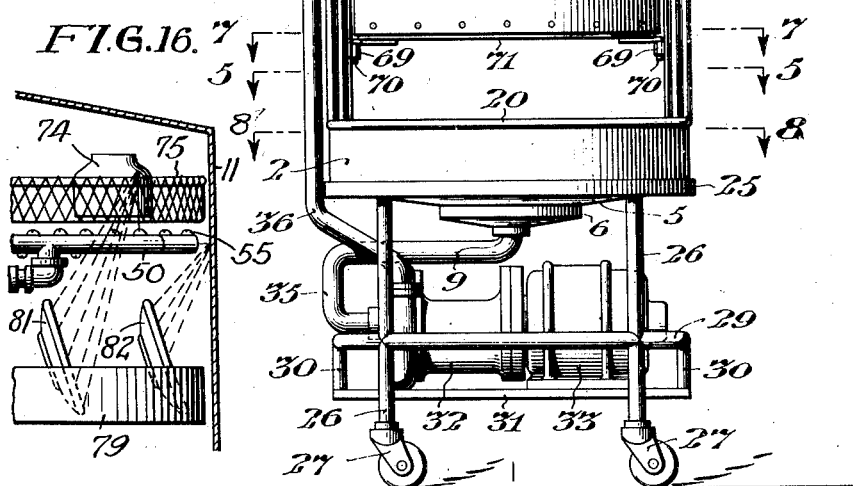
Inventor
Frank G. Walker,
By Clifton C. Hallowell
Attorney Oct. 23, 1934.   F. G. WALKER   1,977,977
DISHWASHING MACHINE
Filed July 26, 1930   3 Sheets-Sheet 2
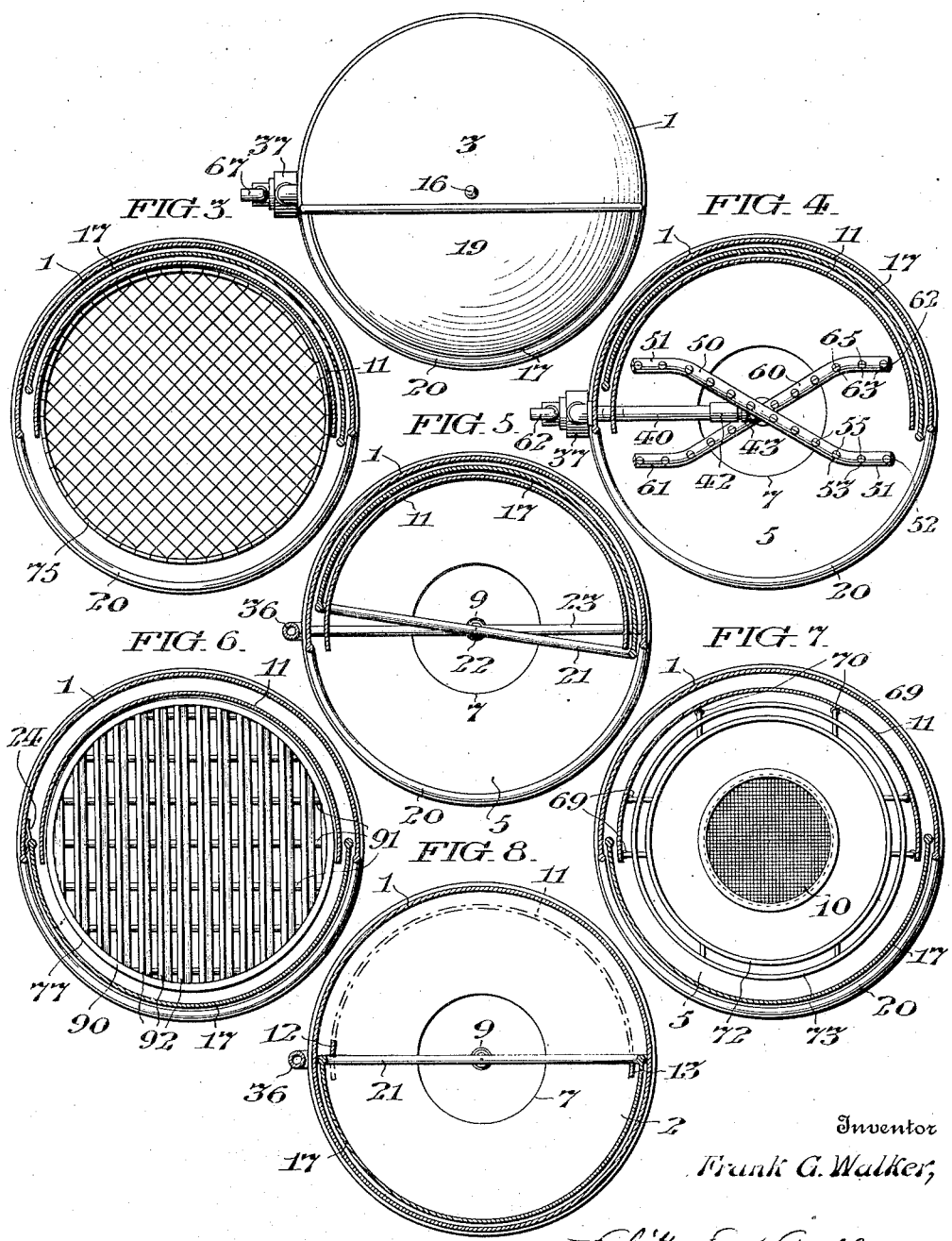
Inventor
Frank G. Walker,
By Clifton C. Callowell
Attorney Oct. 23, 1934.　　　　F. G. WALKER　　　　1,977,977
DISHWASHING MACHINE
Filed July 26, 1930　　　3 Sheets-Sheet 3
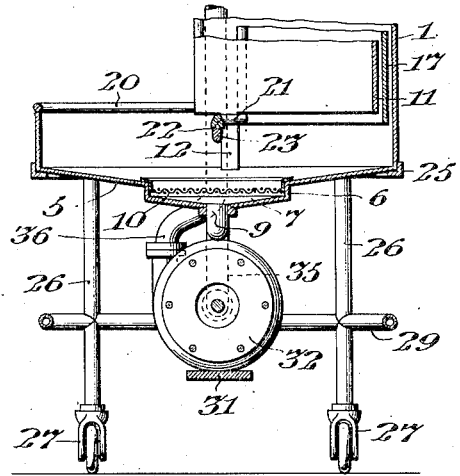
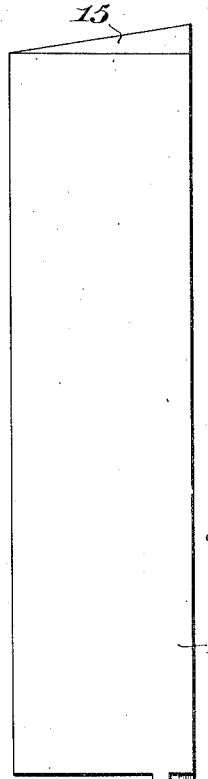
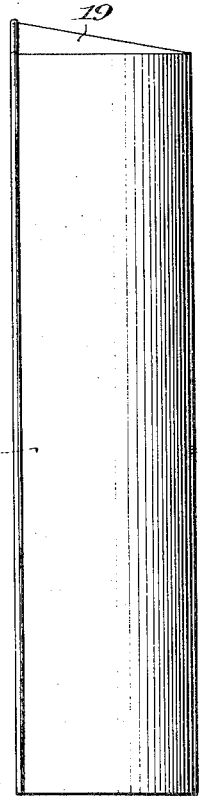
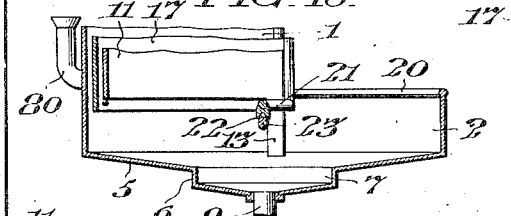
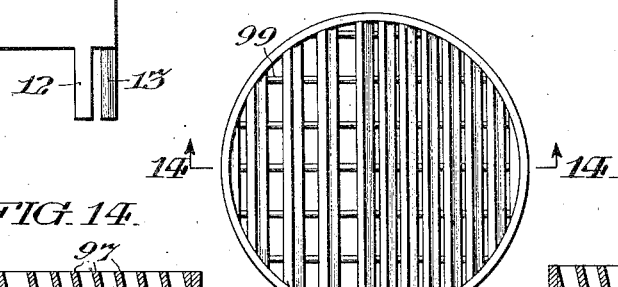
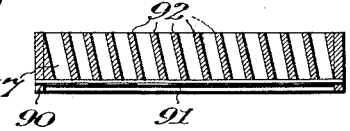
Inventor
Frank G. Walker,
By Clifton G. Hallowell
Attorney Patented Oct. 23, 1934

1,977,977

UNITED STATES PATENT OFFICE 1,977,977

DISHWASHING MACHINE

Frank G. Walker, Santa Barbara, Calif.

Application July 26, 1930, Serial No. 470,801

8 Claims. (Cl. 141—9)

This invention relates particularly to that type of dish-washing machines that may be best adapted to household use, and is especially directed to the novel arrangement of the parts by which its operation is facilitated.

The principal objects of my invention are to provide a dish-washing machine of pleasing appearance that will efficiently wash and dry quickly and thoroughly at one time all dishes of various kinds from an ordinary household table with but a minimum of handling.

Other objects of my invention are to provide a dish-washing machine with a plurality of dish-holding racks disposed one above the other, each being accessible for placing dishes thereon or removing them therefrom without displacing or in any way disturbing any other of said racks of dishes.

Further objects of my invention are to provide a dish-washing machine that will afford a maximum of efficiency by so disposing the operative elements in such cooperative relation that the force of water deflected by the cupped or bowl-shaped dishes is utilized advantageously to wash by a splashing action the substantially flat dishes such as plates or platters and the silverware.

My invention comprehends a dish-washing machine having a disappearing semi-cylindrical closure which conserves space and which so cooperates with the semi-cylindrical casing when closed as to not only provide a watertight receptacle affording a spacious chamber for the dishes, but also tends to retain the heat of the hot water employed in said chamber.

Specifically stated, the form of my invention as hereinafter described comprises a dish-washing machine having a casing including a cylindrical base provided with an inverted conical down-set floor serving as a reservoir for the water to be circulated and having a semi-cylindriform body formed of relatively spaced concentric walls and top, between which a semicylindrical closure or door may be oscillated to open or close the casing as desired; said casing being provided with a plurality of grilles removably supported on brackets upon which grilles, racks or baskets carrying dishes may be removably supported in position to be sprayed by rotatable perforated tubular arms or manifolds connected centrally by pipe branches through a supply pipe with an electrically actuated pump and controlled by a three-way valve, the operating handle of which serves as a spout for the discharge of the used water from said reservoir to a sink or other suitable drain.

My invention also includes all the various novel features of construction and arrangement as hereinafter more definitely specified.

In the accompanying drawings, Figure 1 is a front elevational view of a dish-washing machine constructed in accordance with my invention, and showing the door or closure open and disclosing the interior arrangement; Fig. 2 is a plan view of the machine as shown in Fig. 1, with the door or closure in its closed position; Fig. 3 is a horizontal sectional view of said machine taken on a plane indicated by the line 3—3 in Fig. 1, and showing the upper basket; Fig. 4 is a horizontal sectional view taken on a plane indicated by the line 4—4 in Fig. 1, and showing the arrangement of the sprayer arms or manifolds, the other parts within the chamber being removed for convenience of illustration; Fig. 5 is a horizontal sectional view taken on a plane indicated by the line 5—5 in Fig. 1, and showing the lower supporting arrangement; Fig. 6 is a horizontal sectional view taken on a plane indicated by the line 6—6 in Fig. 1, and showing the lower dish-holding tray or rack, in this view the door or closure being shown in closed position; Fig. 7 is a horizontal sectional view taken on a plane indicated by the line 7—7 in Fig. 1, and showing the dish rack and basket supporting grille and the outlet strainer, the other parts within the chamber being removed for convenience of illustration, and the door or closure being shown in closed position; Fig. 8 is a horizontal sectional view similar to Fig. 5, but taken at a lower level on a plane indicated by the line 8—8 to show the supporting feet of the inner wall of the casing, the door or closure being shown in its closed position; Fig. 9 is a fragmentary central vertical sectional view of the lower portion of the machine taken on the line 9—9 in Fig. 1 and including its supporting stand, pump and actuating mechanism; Fig. 10 is a fragmentary central vertical sectional view taken on the line 10—10 in Fig. 1, similar to Fig. 9 but looking in the opposite direction and omitting the supporting stand for convenience of illustration; Fig. 11 is a side elevational view of the inner wall per se of the casing structure; Fig. 12 is a side elevational view of the door or closure per se; Fig. 13 is a plan view of the upper dish-holding tray or rack; Fig. 14 is a central vertical sectional view of said upper dish-holding tray or rack taken transversely through its dish-spacing slats or bars on the line 14—14 in Fig. 13; Fig. 15 is a central vertical sectional view of the lower dish-holding tray or rack shown in plan in Fig. 6, and Fig. 16 is a fragmentary sectional elevational view showing the relation of the cups or bowls with respect to the plates or dishes and illustrating the path of the jets of cleansing fluid as it leaves the manifold and is deflected by the cups to the dishes.

In said figures, the body of the machine comprises the semicylindrical casing 1 rising from the cylindrical basin or reservoir 2 and terminating in the semi-conical roof 3. Said basin or reservoir 2 has the conoidal hopper bottom 5 provided with a downset central depression 6 forming the pocket 7 having a discharge orifice through which the discharge pipe 9 extends, and affording a convenient recess for the strainer 10 which is readily removable and replaceable.

The casing 1 includes a relatively spaced liner or inner wall 11 disposed concentrically therewith and for the greater part terminating short of the hopper bottom 5 but having the supporting legs or standards 12 and 13 respectively disposed at or near its forward edges, the purpose of which will be hereinafter further described.

The upper wall 15 of said liner conforms in relatively spaced relation to the roof 3 and is connected therewith by the headed pin 16 which also conveniently serves as a pintle for the pivoted door or closure 17.

Said door or closure 17 is of semicircular form with its upper wall 19 semiconical and so conforms to the space between the casing 1 and its liner or inner wall 11 as to swing therebetween when in open position, as shown in Figs. 1, 2, 3, 4 and 5, or to be rotated therefrom to cooperate with said casing to form a closed cylindrical chamber, being provided at its lower end, which extends below the upper rim 20 of the basin or reservoir 2, with the crossbar 21 supported upon the pivoted ball-bearing 22 on the diametrically disposed supporting crossbar 23 which connects the forward edge margins of the inner wall or liner 11 and the outer casing, see Figures 5, 8, 9 and 10.

The door or closure 17 is arranged to be retained in its closed position by the spring catch 24 which so projects from the casing wall as to automatically engage or release the edge of said door, as shown in Fig. 6. Similarly said closure may be retained in open position if desired.

It may be here noted that the crossbar 21 is free to swing beneath the lower edge of the inner wall or liner 11, as best shown in Figs. 9 and 10, but is limited in its oscillatory movement by the supporting legs or standards 12 and 13, as best illustrated in Figs. 5 and 8.

The structure thus described is provided with the supporting stand comprising the annular frame 25 having the standards 26 terminating in the roller casters 27 and connected by the circular brace-bar 29 from which depends the hangers 30 carrying the underslung shelf 31 upon which the pump 32 and its driving medium, the electric motor 33, are conveniently supported.

As shown in Figs. 1 and 9, the inlet of the pump 32 is connected with the outlet of the basin or reservoir 2 by the pipe 35, and the outlet of said pump is connected by the pipe 36 with the three-way valve 37 which is connected by the pipe 39 with the branches 40 and 41, the former having the length-adjusting sleeve 42 and upturned elbow 43 and the latter having the sleeve 45 and downturned elbow 46.

Rotatably mounted upon the elbow 43 is a tubular arm or manifold 50 having its end portions 51 bent slightly in opposite directions in a horizontal plane and provided with axially directed orifices 52 through which fluid may be ejected for a twofold purpose, first, to cause said manifold to rotate upon said elbow and second, to flush the inner wall surface of the chamber.

Said manifold 50 is also provided along its upper surface with a plurality of nozzles 53 each preferably provided with a transverse slit 55 through which fluid may be ejected, and although I have, for convenience of illustration, shown said slits 55 disposed in the direction of rotation of said manifold, they may preferably be disposed parallel to the axis of said manifold so that the fan-shaped jets ejected therefrom may relatively overlap each other.

Similarly, the elbow 43 rotatably carries the manifold 60 having its end portions 61 bent in opposition to that of the manifold 50 so that the fluid ejected from the axially directed orifices 62 thereof will cause the manifold 60 to rotate in a direction opposite to the rotation of the manifold 50, and the fluid ejected upwardly through the slits 65 of the nozzles 63 will be flung differently from the fluid ejected from the manifold 50, and consequently there will be a wide diffusion of the spray thus ejected.

The three-way-valve 37, above referred to, comprises the controlling handle 67 which is tubular and which so connects with one of the valve passageways that when turned from the position shown in Fig. 1 to a substantially horizontal position, the fluid passing through the pipe 36 will be diverted from the pipe 39, and will be discharged through said handle 67 serving as a nozzle to direct said fluid to a sink or other receiver.

Suitably disposed in the washing chamber and on the inner wall or lining 11 are brackets 69 spaced at predetermined distances from the floor of the chamber and having reference particularly to the position of the manifolds 50 and 60, see Fig. 1. These brackets as shown provide sockets arranged to receive the downwardly directed supporting lugs 70 of the readily removable and replaceable basket or rack supporting grilles 71 comprising the connected concentric rings 72 and 73, as best shown in Fig. 7.

As shown in Fig. 1, the grilles 71 that are closely associated in superposed relation to the respective manifolds 50 and 60 removably support the wire mesh baskets 75 and 76 that are particularly adapted to carry cups or bowls or similar cup-shaped dishes 74 in an inverted position to receive therein substantially the full force of the jet or spray ejected through the nozzles 53 and 63 and to cooperate therewith in deflecting the fluid downward therefrom by a splashing action on to the dishes 81 carried by the racks 77 and 79 respectively subjacent to the baskets 75 and 76.

It is desirable that the heat and steam be retained within the chamber during the cleansing and rinsing operation, therefore, the basin or reservoir is provided with the inlet pipe 80 through which cleansing fluid or water may be introduced.

As shown in Figs. 6 and 15, the dish-carrying rack 77 is adapted particularly for carrying flat dishes, such as plates, supported on their edges and in a slightly inclined substantially upright position, and therefore to prevent unnecessary rattling and possible chipping of the finer chinaware said rack may preferably be formed of wood or a material having similar characteristics. Said rack 77 comprises the outer circular rim 90 forming an annulus having closely adjacent its lower margin a plurality of transverse bars 91, above which are disposed in normal relation thereto a series of slats 92 slightly inclined to cause the plates disposed between them and resting upon said bars to assume such a cant as to cause the cleansing fluid directed downwardly thereon to strike in a glancing manner.

As shown in Figs. 13 and 14, the dish-carrying rack 79 is similar to the rack 77, the rim 95 being slightly deeper and the slats 96 and 97 being variably spaced to receive dishes of varying size and configuration disposed between them and arranged to rest upon the transverse bars 99.

As shown in Fig. 16, a single jet from the manifolds 50 is depicted to illustrate the action thereof as it is directed upwardly and impinges upon the curved inner surface of the cup and is splashed downwardly in linear paths against the subjacent dishes with such force as to effect efficient cleansing. Similarly, the jet which is directed against the side wall 11 of the housing structure impinges thereon and is not only utilized to propel the manifold 50 in a rotary path, but splashes backwardly and downwardly upon the dishes 82 disposed near said side wall 11. Obviously, the rotation of the manifold constantly changes the position of the impingement of the jets upon the varying curved and inclined surfaces of the cups or bowls 74 and consequently changes the position or impingement of the deflected sprays upon the plates 81 in a sweeping action.

It may be here noted that by the arrangement of the parts as herein shown and described, substantially one-half of the washing chamber is without obstruction when the door or closure is swung back and therefore unhampered access is had to the interior for the manipulation of the dishes or parts, or removing and replacing the baskets or racks and the strainer, and when said door is closed, a chamber is formed which has no flat surfaces to invite the collection of refuse and no corners that might cause eddying currents.

It will be obvious from the foregoing description that the maximum power of the pump is utilized to project jets of maximum force upwardly against the bowl-shaped dishes in the trays superjacent to the manifold, whereby not only a thorough cleansing of said dishes is effected, but, by reason of this maximum force due to directing substantially all of the jets upwardly, a corresponding forceful splash is deflected against the dishes disposed on the tray which is subjacent to said manifold, and the speed of such deflected splash is not detrimentally interfered with, as by jets directed downwardly, and consequently a maximum efficiency of cleansing process is thus attained.

My invention is advantageous in that by the arrangement of the cooperative parts substantially all of the fluid is directed upwardly from the nozzles into the bowl-shaped dishes and is thereby deflected with force and splashed downwardly on to the dishes on the racks beneath, thus the dishes to which grease mostly adheres, or what may be considered the more soiled dishes, and silverware carried by the lower trays are subjected to the action of all of the fluid discharged from the nozzles of both of the manifolds.

This machine is especially designed for use in private homes where all types of dishes from the table may be quickly and thoroughly washed at a single operation and wherein the cleansing fluid may be conveniently discharged and rinsing water substituted without stopping the actuating mechanism.

I do not desire to limit my invention to the precise details of construction and arrangement as herein set forth, as it is obvious that various modifications may be made therein without departing from the essential features of my invention as defined in the appended claims.

Having thus described my invention, I claim:

1. A dish-washing machine comprising a receptacle, means arranged to support a plurality of trays of dishes in said receptacle one above the other, a circulatory system for cleansing fluid including a pump, connected with rotary spray means disposed between said trays and arranged to direct substantially all of the sprays of cleansing fluid upwardly with maximum force incident to the pressure capacity within said system, against dishes disposed upon the relatively superposed tray and cooperative with said dishes to cause said cleansing fluid to be variably deflected by the varying change of position of said sprays with respect to the curvature of the superposed dishes and with a minimum of interference upon the dishes disposed upon the subjacent tray.

2. A dish-washing machine comprising a receptacle, a plurality of spray dispensing means rotatably mounted in said receptacle and arranged to direct substantially all of the cleansing fluid upwardly, means arranged to support trays of dishes respectively above and below each of said spray dispensing means so that the inverted bowl-shaped dishes on the superposed tray will cooperate to variably deflect said cleansing fluid in constantly changing directions upon the flat dishes on the subjacent tray substantially without fluid interference.

3. A dish-washing machine comprising a receptacle, means arranged to support a plurality of trays of dishes in said receptacle one above the other, and movable means disposed between pairs of said trays arranged to supply cleansing fluid, and each having a substantially imperforate lower wall and perforations throughout its upper wall so as to direct sprays upwardly against the bowl-shaped dishes in the superposed trays to be deflected thereby at constantly varying angles upon the dishes on the subjacent trays, said constantly varying angles being due to the movement of said means to cause said sprays to impinge upon different relatively inclined surfaces of said bowl-shaped dishes.

4. A dish-washing machine comprising a receptacle, means arranged to support a plurality of trays of dishes in said receptacle one above the other, manifolds disposed between pairs of said trays arranged to dispense cleansing fluid and having outlets disposed to direct substantially all of said fluid upwardly, the terminals of said manifolds being oppositely bent in a horizontal plane and provided with apertures in their end walls, means arranged to supply said fluid under pressure and means including a valve arranged to connect said manifolds with said means of supply and to control its flow.

5. A dish-washing machine comprising a receptacle, means arranged to support in pairs a plurality of trays of dishes in said receptacle, the trays of the respective pairs being differently spaced, one above the other, means arranged to supply cleansing fluid under pressure, a pipe connected with said fluid supply means and having branches terminating at the axis of said receptacle and between pairs of said trays of relatively different spaced relation, a manifold pivotally connected with each of said branches and having outlet apertures so disposed and extended through the upper walls of each manifold so as to direct substantially all of the cleansing fluid therein upwardly against the dishes on the superposed tray to be deflected upon the dishes on the subjacent trays, and means arranged to control the flow of said fluid.

6. A dish-washing machine comprising a casing having a reservoir for cleansing fluid, dish receiving racks disposed in pairs spaced one above the other in said casing, a pipe line connected with said reservoir and including a motor driven pump, and terminating in rotatable manifolds each being disposed between the racks of said pairs and provided with a substantially imperforate bottom wall and a perforated upper wall, whereby jets of maximum force direct substantially all of the cleansing fluid forced therethrough upwardly against the dishes in the superposed rack and in turn cooperate with said dishes to splash said cleansing fluid downwardly in lineal paths substantially without interference upon the dishes in the subjacent rack with corresponding deflected force.

7. A dish-washing machine comprising a cylindriform casing having an opening arranged to be closed by a semicylindrical closure, cup carrying baskets removably supported in said casing, plate carrying racks each removably supported in said casing beneath one of said cup baskets and at relatively different distances therefrom, a pump driven by an electric motor of limited house current capacity, a pipe line connected with said pump and terminating in rotatable manifolds disposed between said baskets and racks and propelled by fluid pressure therein and having perforations arranged to direct substantially all of said fluid upwardly at maximum contained pressure against the curved inner surfaces of the superposed cups to be deflected thereby in linear streams upon the plates at constantly varying angles.

8. A dish-washing machine comprising a casing having an opening provided with a closure arranged to open and close, article-carrying baskets removably supported in said casing, article-carrying racks each removably supported in said casing beneath one of said article-carrying baskets and disposed at relatively different distances therefrom, a motor-driven pump, a pipe line connected with said pump and terminating in rotatable manifolds disposed between said baskets and racks and propelled by fluid pressure therein and having perforations arranged to direct substantially all of said fluid upwardly at maximum contained pressure against the inner surfaces of the superposed articles to be deflected thereby in linear streams upon the subjacent articles at constantly varying angles.

FRANK G. WALKER.